United States Patent [19]

Harnden, Jr. et al.

[11] Patent Number: 4,489,234
[45] Date of Patent: Dec. 18, 1984

[54] RADIANT-ENERGY HEATING AND/OR COOKING APPARATUS WITH HONEYCOMB COVERPLATE

[75] Inventors: John D. Harnden, Jr., Schenectady; William P. Kornrumpf, Albany; Fred F. Holub, Schenectady, all of N.Y.

[73] Assignee: General Electric Company, Schenectady, N.Y.

[21] Appl. No.: 478,827

[22] Filed: Mar. 25, 1983

[51] Int. Cl.³ .......................... B32B 3/12; H05B 3/40
[52] U.S. Cl. .................................. 219/347; 219/354; 428/116
[58] Field of Search ........ 219/347, 345, 349, 352-355, 219/357, 459, 461, 462, 464, 377, 365, 405, 411; 428/116; 250/503.1, 504 R; 350/1.1, 1.3, 1.6, 319; 362/290, 293, 321, 325

[56] References Cited

U.S. PATENT DOCUMENTS

| | | | |
|---|---|---|---|
| 2,275,745 | 3/1942 | Eastman | 250/504 |
| 3,244,859 | 4/1966 | Whiteford | 219/343 |
| 3,355,574 | 11/1967 | Bassett, Jr. | 219/352 |
| 3,585,390 | 6/1971 | Ishikawa | 250/503.1 |
| 3,644,022 | 2/1972 | Jagdt et al. | 428/116 |
| 3,863,251 | 1/1975 | Gould et al. | 362/290 |
| 3,919,543 | 11/1975 | Noren | 362/290 |
| 4,316,241 | 2/1982 | Gulliksen | 362/325 |
| 4,395,775 | 7/1983 | Roberts et al. | 350/319 |
| 4,448,828 | 5/1984 | Mochida et al. | 428/116 |

FOREIGN PATENT DOCUMENTS 475212  11/1937  United Kingdom ............... 362/290

Primary Examiner—Roy N. Envall, Jr.
Assistant Examiner—Geoffrey S. Evans
Attorney, Agent, or Firm—Geoffrey H. Krauss; James C. Davis, Jr.; Marvin Snyder

[57] ABSTRACT

Radiant-energy heating and/or cooking apparatus has an infrared-wavelength radiation-producing element, a reflector for concentrating the infrared radiation and a coverplate through which the concentrated radiation is transmitted to a recipient material, e.g. foodstuffs to be cooked. The coverplate has first and second surface members separated from one another by a honeycomb of tubes; the members and tubes are fabricated of an infrared-transmissive material. The resulting honeycomb coverplate has low infrared absorption and great mechanical strength capable of withstanding severe thermal shock.

12 Claims, 2 Drawing Figures

RADIANT-ENERGY HEATING AND/OR COOKING APPARATUS WITH HONEYCOMB COVERPLATE

BACKGROUND OF THE INVENTION

The present invention relates to apparatus for heating and/or cooling a material, such as foodstuffs and the like, and, more particularly, to novel radiant-energy cooking and/or heating apparatus having a honeycomb coverplate.

It is well known to provide foodstuff-cooking apparatus having a heating means positioned to provide infrared energy at a cooking surface. One prior-art heating and/or cooking appliance utilizes an unprotected infrared source, such as a heating element and the like, and a reflecting surface to direct the infrared energy from the heating source to a foodstuff load, such as a cooking utensil and the like, which rests on a metallic grid placed across the mouth of the reflector. In another prior-art heating and/or cooking appliance, the metallic grid is replaced by a surface member which is transparent to infrared radiation. This surface member is typically a coverplate formed of a high-temperature, high-strength material, such as quartz or a glass which has been chemically strengthened.

The cooking/heating apparatus advantageously utilizes a layer of visible-wavelength radiation-absorbing material, as described and claimed in co-pending application Ser. No. 478,826, filed on even date herewith, assigned to the assignee of the present invention and incorporated herein by reference. By absorption of at least a portion of the visible-wavelength radiation emitted by a heating means operating at a relatively high temperature, the user does not suffer from visual discomfort during the use of radiant-energy apparatus having an increased amount of foodstuff-cooking infrared-wavelength radiation emitted therefrom.

In all radiant-energy cooking systems hitherto known to us, the coverplate must not only transmit significant amounts of infrared-wavelength energy, but must also be of great strength, as the coverplate is normally at a relatively high temperature during cooking unit operation and must be able to withstand severe thermal shock in the event that cold liquids are spilled upon the hot coverplate. Special materials are often required, which increases the coverplate cost. The coverplate thickness must often then be such that additional absorption of infrared-wavelength radiation occurs, thereby raising the coverplate temperature and requiring even greater strength and thermal-shock resistance. It is highly desirable to provide a coverplate for radiant-energy apparatus, which coverplate is fabricated of relatively low cost material and yet has relatively high mechanical strength, thermal-shock resistance and infrared-wavelength energy transmissivity.

BRIEF SUMMARY OF THE INVENTION

In accordance with the invention, the coverplate for radiant-energy heating and/or cooking apparatus utilizes a pair of planar members, of infrared-wavelength radiation-transmissive material, bounding opposite surfaces of a honeycomb structure. The honeycomb structure is advantageously comprised of a multiplicity of tubular members, all of substantially the same length, of radiation-transmissive material (such as glass and the like), and all having their cylindrical axes aligned substantially parallel to one another and perpendicular to the interior surfaces of the planar members.

In one presently preferred embodiment, in which the tubular honeycomb members and planar members are made of Pyrex ® glass, assembled and heated to a temperature sufficient to fuse the top and bottom planar members to the vertical honeycomb tube segments, an additional scratch resistant coating is placed upon the exterior surface of at least one of the planar members.

A pair of honeycomb-coverplate heating/cooking units can be placed to face one another, with a cooking/heating volume defined therebetween, and with one, the other or both of the sources being selectively energized to perform baking, broiling, toasting and the like cooking operations upon foodstuffs placed in the defined volume.

Accordingly, it is one object of the present invention to provide radiant-energy cooking/heating apparatus having a novel honeycomb coverplate.

This and other objects of the present invention will become apparent upon consideration of the following detailed description, when read in conjunction with the drawings.

DETAILED DESCRIPTION OF THE INVENTION

Figure 1:
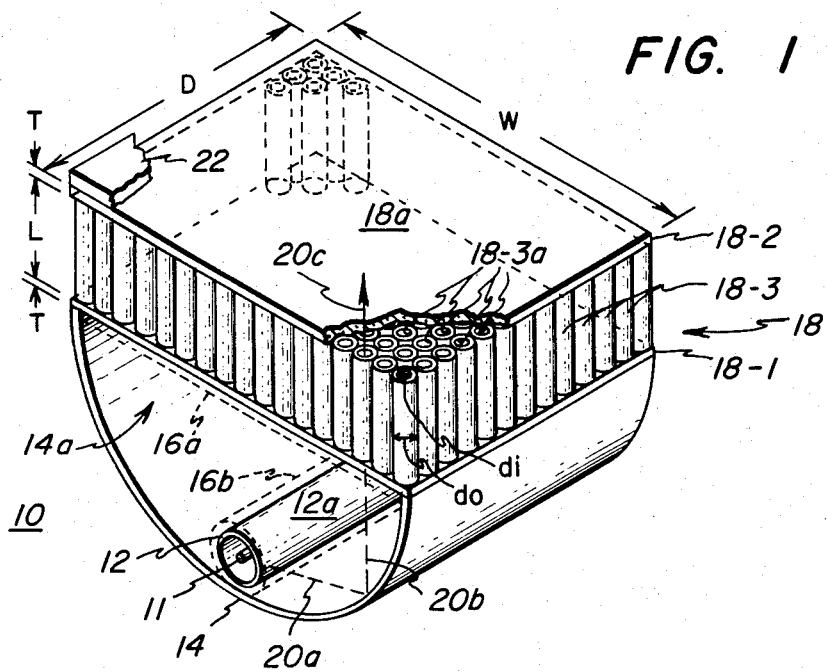
FIG. 1 is a perspective view of radiant-energy apparatus utilizing a honeycomb coverplate, in accordance with the principles of the present invention.

Referring initially to FIG. 1, one presently preferred embodiment of our novel radiant-energy heating and/or cooking apparatus 10 utilizes a radiant-energy producing means 11, such as a tungsten filament and the like. Filament 11 is preferably enclosed within a tube 12 of a material that is substantially transmissive of at least infrared wavelengths in the range from about 0.7 microns to about 3 microns. Advantageously, filament 11, which may be a helically-coiled filament having its direction of elongation positioned along the linear center line of cylindrical tube 12, will be operated at temperatures between about 2000° K. and about 3000° K., and preferably at a temperature between about 2200° K. and about 2600° K. The heating tube is mounted, by means not shown but well known to the art, with the filament 11 substantially at the focus of a reflector means 14. Reflector means 14 may be a parabolic trough serving to collect and concentrate at least the infrared-wavelength radiant energy toward an open mouth region 14a of the reflector means. A visual-wavelength light-filtering means 16 is interposed between the radiant-energy source (filament 11) and the mouth of reflector means 14. As described in the aforementioned co-pending application Ser. No. 478,826, the visual-wavelength absorber may be a layer 16a of iron oxide and the like, extended across the mouth region 14a of the reflector means, or may be a visual-wavelength radiation-absorbing layer 16b fabricated upon the exterior surface 12a of the tube 12 enclosing the energy-producing heating means 11. Thus, radiant energy flowing outwardly through the surface defined by the reflecting means mouth region 14a has a reduced visible-wavelength light content, while the relatively high content of infrared-wavelength energy remains relative unattenuated.

In accordance with the invention, a coverplate 18 is placed outwardly adjacent to and across the reflecting means mouth region 14a. Coverplate 18 must provide relatively high transmission of the foodstuff-cooking infrared-wavelength energy, have relatively high mechanical strength (to support a foodstuff-containing cooking vessel and the like) and be able to withstand severe thermal shock in the event that liquids impinge upon the coverplate exterior surface 18a, as may occur when foodstuffs overflow from a cooking utensil placed upon cover surface 18a. Coverplate 18 includes a lower surface member 18-1 spaced from and joined to an upper surface member 18-2 by a honeycomb structure 18-3. The honeycomb structure 18-3 is, in a presently preferred embodiment, fabricated of a multiplicity of tubes 18-3, all of essentially the same length L and having their axes substantially parallel to one another and perpendicular to the interior surfaces of lower and upper planar members 18-1 and 18-2. Members 18-1 and 18-2 and tubes 18-3 are formed of a glass, such as Pyrex® and the like, characterized by both low absorption of infrared-wavelength radiation and the ability to withstand relatively high temperatures. The tubes 18-3 have an interior diameter $d_i$ which is as large as practical for a given outer diameter $d_o$, whereby a high percentage of the honeycomb structure is open and does not absorb any infrared-wavelength energy. The percentage of open honeycomb volume can, it will be seen, be adjusted by suitable choice of tubing diameter and wall thickness, such that suitable tradeoffs between infrared-wavelength energy absorption and structural strength can be achieved.

Coverplates 18 have been fabricated with widths W and depths D of $5\frac{1}{4}$ inches$\times 7\frac{1}{4}$ inches, $6\frac{1}{4}$ inches$\times 9\frac{1}{2}$ inches and 9 inches$\times 15$ inches, respectively, utilizing top and bottom planar members 18-1 and 18-2 of glass having a thickness T of about $\frac{1}{8}$ inch. The coverplates 18 utilize tubes of length L between about $\frac{1}{2}$ inch and about 1 inch long, of outside diameter $d_o$ from about $\frac{1}{2}$ to 1 inch, and with wall thicknesses (i.e. one-half the difference between the outer diameter $d_o$ and inner diameter $d_i$) on the order of 0.1 inch. The plurality of tubes 18-3 are cut from tubular stock in substantially equal lengths, with end surfaces substantially perpendicular to the tube axis. The tubes are placed upon one surface of planar member 18-1, with the tube axes essentially perpendicular to the planar member surface and with the exterior surfaces of adjacent tubes substantially in abutment with one another. The tubes 18-3 may be placed in a rectangular array, as shown, or in any other configuration. It should be understood that the honeycomb members 18-3 need not be of circular cross section, but may have any desired cross-sectional shapes, including square, rectangular, triangular, oval, hexagonal, octagonal and the like; the bores also need not be circular. After placing the honeycomb members 18-3 in the desired array upon the bottom planar member 18-1, the top planar member 18-2 is placed upon the aligned opposite ends of the honeycomb members. A suitable retaining fixture (not shown) may be utilized to maintain the structural relationship and/or to apply pressure upon the exterior surface of members 18-1 and 18-2, while coverplate 18 is heated to a temperature sufficient to fuse the top and bottom members 18-1 and 18-2 to the honeycomb structure segments 18-3.

In operation, radiant-energy rays 20a, emitted from heating means 11, are reflected by reflecting means 14. The reflected rays 20b are transmitted through lower planar member 18-1 and are substantially perpendicular to the planar member surface. Rays 20b are thus aligned parallel to the honeycomb tube axes and are substantially transmitted through the bores of the tubes 18-3 and thence through the top planar member 18-2. The radiant energy emerges from coverplate surface 18a as rays 20c substantially parallel to the surface. Because some degree of infrared-wavelength radiation absorption occurs within the walls of tubes 18-3, radiation rays which are not directed substantially along the tube axes tend to encounter greater absorption than those rays directed parallel to the axes, whereby radiant energy "spill-over" is minimized.

The coverplate top surface 18a may, if desired, be provided with a scratch resistant coating 22, such as a polysiloxane coating layer or a layer of a heat-resistant fluorocarbon resin. This abrasion-resistant infrared-transmitting protection layer prevents scratching of the coverplate glass surface by cooking utensils. The scratch-resistant coating 22 may be fabricated upon the exterior surface of lower planar member 18-1, as well as upon the exterior surface of upper planar member 18-2, so that both surfaces are available for use as the actual cooking surface. In this manner, the coverplate may be removed, cleaned and replaced without regard as to which surface is placed as surface 18a and available to the user.

Figure 2:
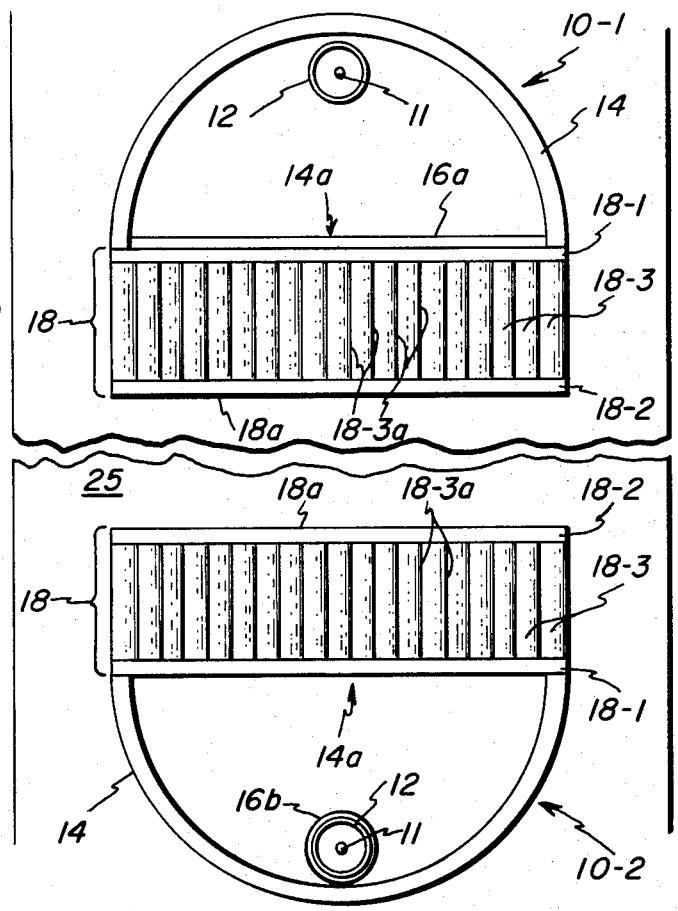
FIG. 2 is an end view of apparatus utilizing a pair of the radiant-energy units with juxtaposed coverplates for defining a heating/cooking volume.

Referring now to FIG. 2, a pair of cooking/heating units 10-1 and 10-2 can be placed in juxtaposition with one another, such that their infrared-wavelength radiation-emitting surfaces 18a are facing one another and define a volume 25 in which foodstuffs are placed for cooking. Illustratively, upper cooking unit 10-1 utilizes a visible-wavelength radiation-absorbing layer 16a across the reflector mouth region 14a while lower cooking unit 10-2 utilizes a visible-wavelength radiation-absorbing coating 16b upon the heating means tube 12. Both units use a honeycomb coverplate 18, secured to the associated reflecting means and the like members by means (not shown) known to the art. The heating means 11 of the upper and lower cooking units 10-1 and 10-2, respectively, can each be selectively energized, by means not shown, to carry out broiling, baking, toasting and other cooking functions in manner well known to the cooking arts. Suitable insulation means, not shown, can be utilized about the exterior of cooking units 10-1 and 10-2 and the cooking volume 25 defined therebetween, as well as about the exterior of apparatus 10 of FIG. 1, as required for a particular end use.

While presently preferred embodiments of our novel radiant-energy heating and/or cooking apparatus with honeycomb coverplate have been described herein, many modifications and variations will now become apparent to those skilled in the art. It is our intent, therefore, to be limited only by the scope of the appending claims and not by way of details and instrumentalities provided herein by way of description of these preferred embodiments.

What is claimed is:

1. Apparatus for at least one of radiant-energy heating and radiant-energy cooking, comprising:
   heating means for producing at least infrared-wavelength radiation;

means for directing substantially all of at least said infrared-wavelength radiation from said heating means toward a surface;

a coverplate comprised of: a first member substantially defining said surface; a second member spaced from said first member and between said first member and said heating means; and a honeycomb structure disposed between, and substantially joined to, said first and second members; said coverplate having substantial transmission of said at least infrared-wavelength radiation therethrough to said surface.

2. The apparatus of claim 1, further comprising means disposed between said heating means and said surface for reducing the amount of visible-wavelength radiation available at said surface.

3. The apparatus of claim 1, wherein said honeycomb structure comprises a multiplicity of tubes substantially parallel to one another.

4. The apparatus of claim 3, wherein said tubes have axes substantially parallel to one another.

5. The apparatus of claim 4, wherein each of said first and second members has an interior surface facing the interior surface of the other member, and each of said multiplicity of tube axes is aligned substantially perpendicular to said first and second member interior surfaces.

6. The system of claim 5, wherein a first end of each of said multiplicity of tubes is fused to an interior surface of said first member and an opposite end of each of said multiplicity of tubes is fused to an interior surface of said second member.

7. The system of claim 3, wherein each tube is of substantially annular cross section.

8. The system of claim 3, wherein at least some of said multiplicity of tubes have an exterior surface substantially in abutment with the exterior surfaces of adjacent ones of said multiplicity of tubes.

9. The system of claim 1, wherein said honeycomb structure is formed of an infrared-radiation-transmitting glass material.

10. The system of claim 1, further comprising means fabricated upon the exterior surface of at least one of said first and second members for resisting scratching of said exterior surface.

11. The system of claim 10, wherein said scratch resisting means is fabricated upon the exterior surfaces of both said first and second members.

12. The system of claim 10, wherein said scratch resisting means is a coating of one of the group of a polysiloxane material and a heat-resistant flurocarbon resin.

* * * * *